(12) United States Patent
Gamberini (10) Patent No.: US 9,510,520 B2
(45) Date of Patent: Dec. 6, 2016

(54) GREENHOUSE FOR THE UNDERWATER CULTIVATION OF TERRESTRIAL PLANT SPECIES AS WELL AS AN UNDERWATER CULTIVATION ASSEMBLY USING IT

(71) Applicant: MESTEL SAFETY S.R.L., Sant'Olcese (IT)

(72) Inventor: Sergio Cristoforo Gamberini, Genoa (IT)

(73) Assignee: MESTEL SAFETY S.R.L., Sant'Olcese (GE) (IT)

( * ) Notice: Subject to any disclaimer, the term of this patent is extended or adjusted under 35 U.S.C. 154(b) by 336 days.

(21) Appl. No.: 14/073,007

(22) Filed: Nov. 6, 2013

(65) Prior Publication Data
US 2014/0137467 A1 May 22, 2014

(30) Foreign Application Priority Data
Nov. 6, 2012 (IT) .............................. MI2012A1891

(51) Int. Cl.
*A01G 9/14* (2006.01)
*B63C 11/44* (2006.01)
*B63B 35/44* (2006.01)

(52) U.S. Cl.
CPC ............. *A01G 9/1407* (2013.01); *B63C 11/44* (2013.01); *B63B 2035/4493* (2013.01)

(58) Field of Classification Search
CPC ........ A01G 9/00; A01G 9/14; A01G 9/14087; A01G 9/1438; A01G 13/02; A01G 13/0206; A01G 13/0293; B63C 11/00; B63C 11/44; B63C 11/34; B63D 2035/4493

USPC .......................................................... 137/589
See application file for complete search history.

(56) References Cited

U.S. PATENT DOCUMENTS

| | | | | |
|---|---|---|---|---|
| 3,712,070 A | * | 1/1973 | Macinnis ................ | B63C 11/44 114/315 |
| 3,875,753 A | * | 4/1975 | Ehlers ..................... | B63C 11/44 405/185 |
| 3,991,583 A | * | 11/1976 | Scurlock ................. | E21B 41/06 405/193 |

(Continued)

FOREIGN PATENT DOCUMENTS

| | | |
|---|---|---|
| GB | 1 093 879 A | 12/1967 |
| GB | 2 220 019 A | 12/1989 |
| WO | WO2015/110710 | * 7/2015 |

OTHER PUBLICATIONS

Italian Search Report IT MI20121891 Dated Jul. 8, 2013.

*Primary Examiner* — Lisa Tsang
*Assistant Examiner* — Magdalena Topolski
(74) *Attorney, Agent, or Firm* — Hedman & Costigan, P.C.; James V. Costigan; Kathleen A. Costigan (57) ABSTRACT

The present invention refers to a greenhouse (10) for underwater cultivation of terrestrial plant species as well as to an underwater cultivation assembly using it, in which the greenhouse (10) for underwater cultivation of terrestrial plant species is characterised in that it comprises a balloon (11) adapted to being filled with air in an underwater environment (50), the balloon (11) comprising an aperture (12) for lower access, the balloon (11) being made from material that is impermeable to water and permeable to light, the balloon (11) comprising at least one inner support shelf (17) for housing at least one seedbed (53) and means for restraining (14) to the floor (51) of the aquatic basin.

13 Claims, 5 Drawing Sheets

(56) References Cited

U.S. PATENT DOCUMENTS

| | | | |
|---|---|---|---|
| 4,724,790 A | 2/1988 | Blanc | |
| 5,311,699 A * | 5/1994 | Huffman | A01G 13/0206 47/22.1 |
| 6,467,424 B1 * | 10/2002 | Yates | B63C 11/00 114/312 |
| 6,843,285 B2 * | 1/2005 | Ozawa | B67D 1/0835 137/587 |
| 2005/0186032 A1 * | 8/2005 | Quattlebaum | B63C 11/44 405/136 |
| 2008/0066758 A1 | 3/2008 | Richardson | |
| 2009/0308877 A1 * | 12/2009 | David | B65D 51/1683 220/567.2 |

\* cited by examiner

GREENHOUSE FOR THE UNDERWATER CULTIVATION OF TERRESTRIAL PLANT SPECIES AS WELL AS AN UNDERWATER CULTIVATION ASSEMBLY USING IT

The present invention refers to a greenhouse for the underwater cultivation of terrestrial plant species as well as to an underwater cultivation assembly using it. In terms of temperature and sun exposure, the underwater environment is particularly advantageous for cultivating terrestrial plant species that require a shaded environment and low temperature ranges for there to be an optimal growth.

Indeed, already at medium depths there are temperatures that are substantially stable over the twenty-four hours and the sun is filtered by the layer of water above.

There has thus been the requirement of creating a greenhouse, that could be implanted in an underwater environment, which could make it possible to cultivate terrestrial plant species, despite the absence, under water, of a form of oxygen and carbon dioxide that they can assimilate.

Correspondingly, it has become a requirement to make an underwater cultivation assembly that can make it possible to transport seedbeds from and towards the underwater greenhouse, in a manner that is isolated from the underwater environment.

The purpose of the present invention is thus that of conceiving a greenhouse for the underwater cultivation of terrestrial plant species that can be easily installed and accessed in an underwater environment. Another purpose of the present invention is that of providing a greenhouse for the underwater cultivation of terrestrial plant species that ensures a sufficient provision of elements that are essential for the correct development of the cultivations, substantially without human intervention.

A further purpose of the present invention is that of making an underwater cultivation assembly that ensures that there is no contact of the cultivations with the surrounding water both during the seeding and the harvesting of the cultivations, and during the development thereof.

These and other purposes according to the present invention are achieved by making a greenhouse for the underwater cultivation of terrestrial plant species as outlined in claim 1.

Further characteristics of the greenhouse are object of the dependent claims.

The characteristics and the advantages of a greenhouse for the underwater cultivation of terrestrial plant species according to the present invention shall become clearer from the following description, given as an example and not for limiting purposes, with reference to the attached schematic drawings, in which.

With reference to the figures, a greenhouse for the underwater cultivation of terrestrial plant species is wholly shown with reference numeral 10.

The greenhouse 10 for the underwater cultivation comprises a balloon 11 that is suitable for being filled with air in an underwater environment 50, fitted with an aperture 12 for lower access and made from material that is impermeable to water and permeable to light.

By balloon 11 we mean any hollow body that can be filled with aria in an underwater environment 50.

In the preferred embodiment illustrated, the balloon is made of flexible material.

In such an embodiment the balloon preferably comprises, at the aperture for lower access and perimetrically thereto, a rigid ring element 13 that is suitable for counteracting the collapse/sagging or the bending of the flexible material in such an area.

The rigid ring element 13 makes it possible to maintain the inlet symmetry of the balloon, reducing its possible deformation.

In such a way, an underwater worker 55 can more easily enter and exit the balloon.

Such a ring element 13 moreover acts as a support point for possible additional accessories.

The balloon 11 moreover comprises means for restraining 14 to the floor of the aquatic basin 51, such as for example a plurality of cables 14a that are connected below to special anchors 14b or ballast weights.

Figure 6:
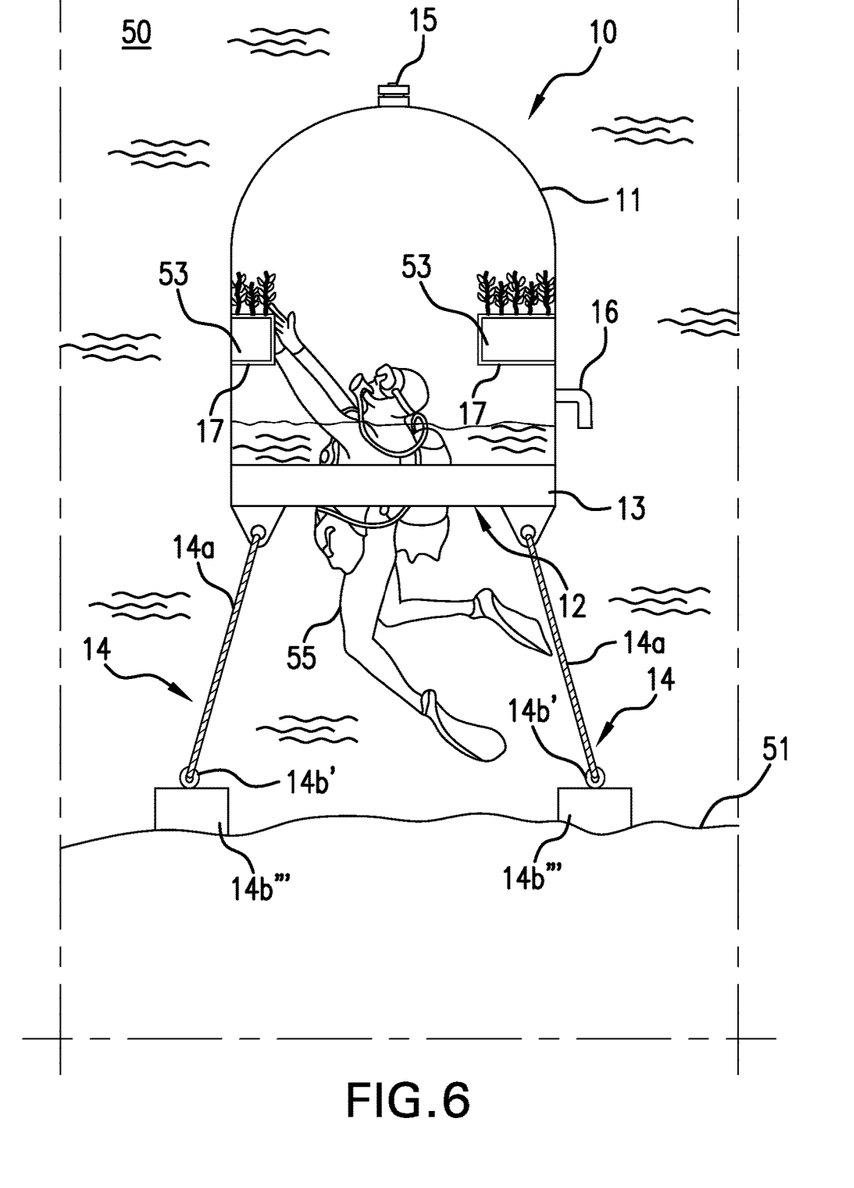
FIG. 6 is schematic view in side elevation of the greenhouse for the underwater cultivation of terrestrial plant species according to the present invention where the anchors are ballast weights.

FIG. 6 shows the positioning of ballast weights 14b''' on the floor of an aquatic basin.

In particular, the anchors 14b can be made in the form of rods comprising an eyelet 14b' at one end, for connecting to the cables and, at the other end, a rotary auger 14b'' for driving into sandy, muddy or in any case non rocky seabeds.

The restraint means 14 must guarantee an anchoring that is capable of fully counteracting the hydrostatic thrust due to the weight of the volume of the water moved by the balloon filled with air. For example, in the case in which the volume of water moved is equal to 100 l, the restraint means must be capable of guaranteeing at least 150 kg of traction.

The balloon 11, on the top opposite with respect to its own aperture for lower access, comprises a first vent valve 15 for releasing the air inside the balloon.

Figure 1:
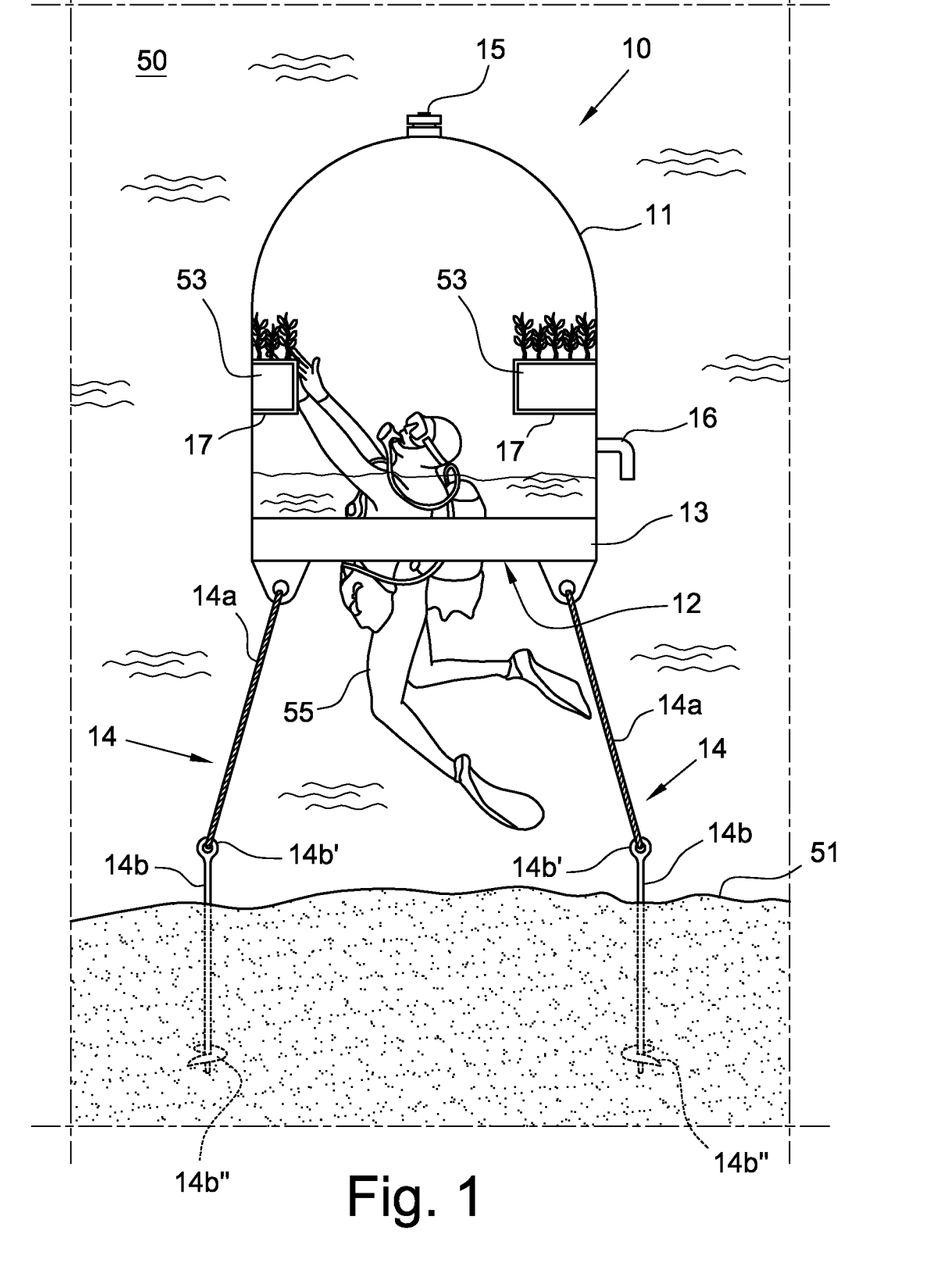
FIG. 1 is a schematic view in side elevation of the greenhouse for the underwater cultivation of terrestrial plant species according to the present invention.
Figure 2:
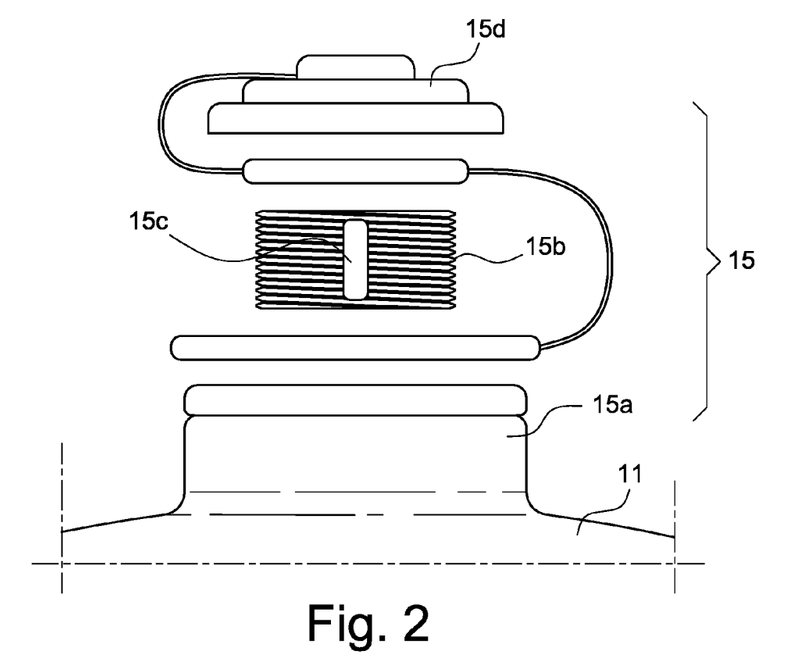
FIG. 2 is a schematic view in side elevation of the first vent valve of the greenhouse of FIG. 1 in an exploded configuration.

Such a first vent valve 15 comprises a circular base body 15a integrated in the surface of the balloon 11, at an upper aperture thereof, for example through welding.

The base valve body 15a is fitted with a threaded portion for joining to a threaded cylindrical closing element 15b, fitted with a lateral through hole 15c.

The progressive screwing of the closing element 15b on the base valve body 15a adjusts the lateral through hole portion 15c placed in direct contact with the external environment and therefore the dimensions of the connection passage between the external environment and the inside of the balloon 11.

The closing element 15b has an upper cover 15d that is suitable for closing the internal channel of the cylindrical closing element 15b with respect to the external environment.

Preferably, the upper cover 15d is removable so as to allow a rapid emptying of the air contained inside the balloon 11.

At the open lower portion of the balloon, integrated in its surface, it is foreseen for there to be a second valve 16 for adjusting the level 52 of the water-air interface inside the balloon 11.

Through such a second valve it is possible to prevent an excessive filling of air inside of the balloon 11 with the consequent risk of it lifting from the floor 51 and/or the tearing/breaking thereof 11.

Figure 3:
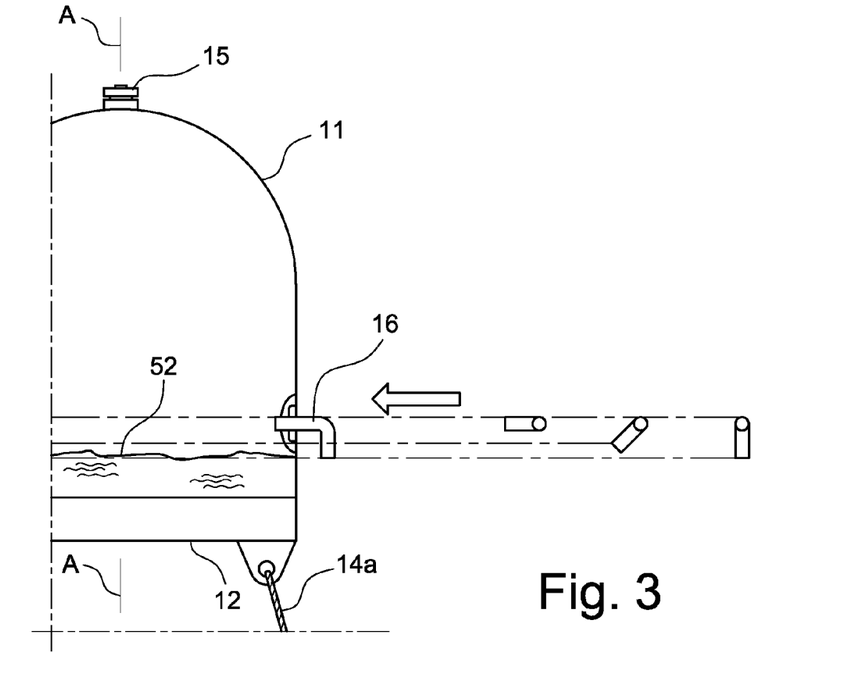
FIG. 3 is a partial schematic view illustrating the operation of the second adjustment valve of the greenhouse of FIG. 1.

The second valve 16 comprises an L-shaped tubular element which, as shown in FIG. 3, can rotate, defining the possible maximum air filling levels, for example as a function of the distance which is desired to be kept between the seedbeds and the water-air interface 52.

In particular, if the tubular element is positioned horizontally, the balloon is filled with less air, whereas if it is positioned vertically downwards, it is filled with more air.

In other words, the length of the sector of the tubular element 16 parallel to the axis A of the aperture 12 for lower access of the balloon 11 makes it possible to determine the height of the air-water interface 52.

Such a second valve 16 is essential in order to allow an underwater worker 55 to operate inside the balloon 11: it limits the amount of air contained inside the balloon 11, preventing the air exhaled by an underwater worker 55 from filling the balloon 11 until it is broken or detached from the floor 51.

The balloon 11 internally comprises at least one support shelf 17.

In the preferred embodiment illustrated, it is foreseen for there to be a plurality of shelves 17 that are positioned perimetrically with respect to the surface inside the balloon 11 at a height that is greater with respect to the second valve 16 therefore, in the operative configuration, above the air-water interface 52.

Figure 4:
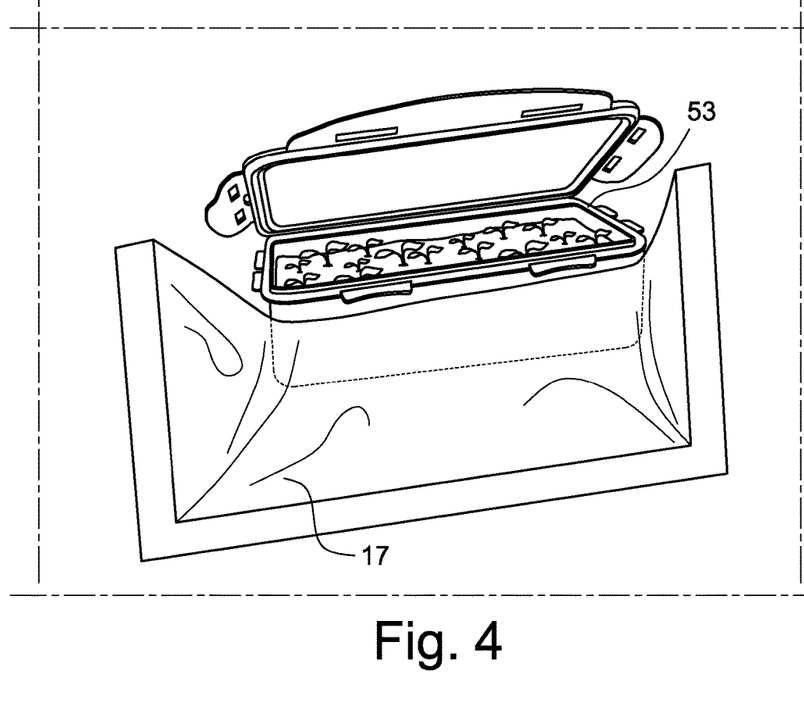
FIG. 4 is a perspective view of a detail inside the greenhouse of FIG. 1.

Such shelves 17 act as supports for housing seedbeds 53, made for example in the form of a tray or vase, and/or for housing runoff drains (not illustrated). Preferably, as shown in FIG. 4, the support shelves 17 are made in flexible material in the form of a pocket with dimensions that match the seedbeds 53 and/or the runoff drains, so that these can be blocked therein 17 through shape coupling.

Preferably, the runoff drains are positioned at a perforated shelf (not illustrated) so as to allow the draining of liquids.

The runoff drains positioned on a shelf constitute a so called "technical area" that acts as a support for the insertion/extraction operations of the seedbeds in/from special water-tight transport containers 20 described in the rest of the description.

For the purpose of transporting the seedbeds 53 from and toward the greenhouse 10 in an isolated manner with respect to the surrounding underwater environment 50, it is foreseen for at least one special water-tight container 20 to be used in association with the greenhouse 10 according to the present invention so as to form an underwater cultivation assembly according to the present invention.

Figure 5:
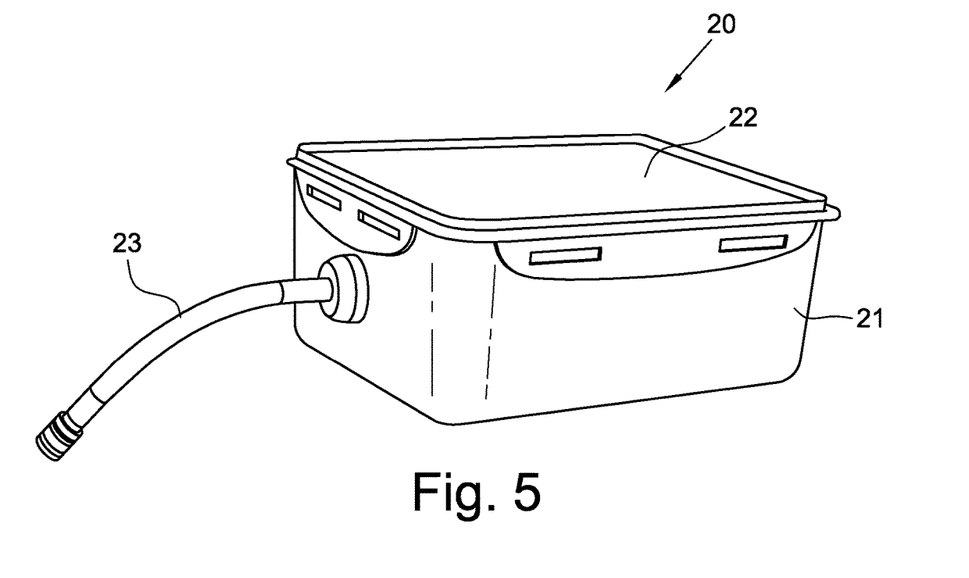
FIG. 5 is a perspective view of a water-tight container used associated with the greenhouse for the underwater cultivation of terrestrial plant species according to the present invention.

The water-tight container 20 comprises a box-shaped body 21 that is fitted with a cover 22 at least partially removable and with an interface 23 for connecting to underwater immersion equipment, like for example a quick coupling that can be connected to a second dispenser stage.

According to one advantageous embodiment, the water-tight container 20 has ballast weights so as to ensure a slight positivity in transportation. Basically, as a function of the transportation volume defined inside the water-tight container 20, a ballast weight is selected that, in free underwater conditions, allows it to rise softly to the surface.

Figure 7:
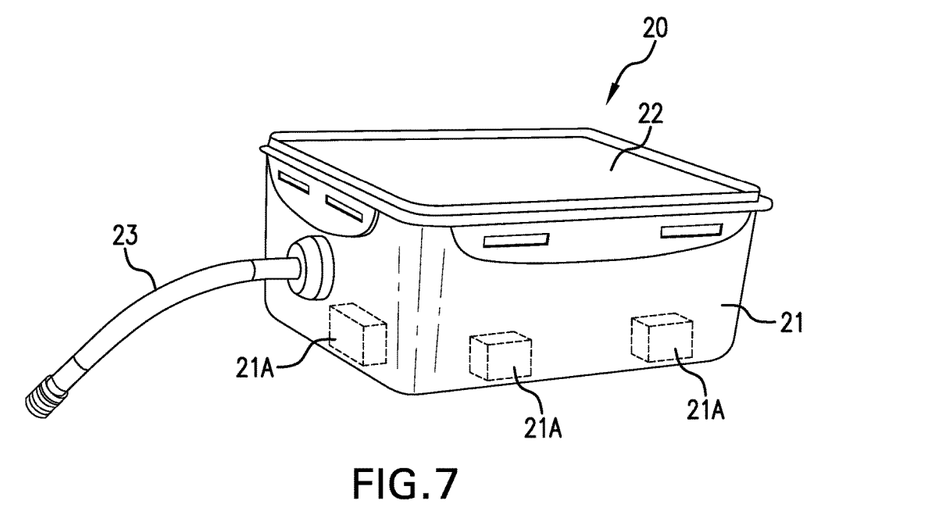

FIG. 7 shows the positioning of ballast weights 21a in a box-shaped body as in FIG. 5.

Preferably, the greenhouse 10 for underwater cultivation is provided with an underwater communication system that is inserted in a special pocket obtained on the outside of the balloon (not illustrated).

Such a communication system preferably comprises a microphone and an internal speaker (not illustrated). The underwater communication system can be of the ultrasound type or, as an alternative, of the cable type.

In an even more preferable manner, the greenhouse for underwater cultivation is provided with a water-tight lighting system of the solar powered type (not illustrated).

The operation of the greenhouse and of the assembly for the underwater cultivation of terrestrial plant species is as follows.

An underwater worker 55 positions the restraint means 14 on the floor 51 of the aquatic basin 50 so as to anchor the balloon 11 at the selected depth.

Subsequently, the underwater worker 51 transports the balloon 11 by hand to the positioning area, anchors it 11 to the floor 51, connecting it to the restraint means 14, and fills the balloon 11 with air, introducing it through the aperture 12 for lower access thereof 11.

The amount of air that the worker introduces is at least such as to bring the shelves 17 inside the balloon 11 above the water-air interface 52. In particular, the filling of the balloon with air occurs until the water-air interface 52 has reached the height at which the second valve 16 is positioned.

At least one seedbed 53 is thus prepared at the surface and is placed in a water-tight container 20.

The water-tight container 20 is subsequently sealed and transported underwater connected to an underwater immersion equipment so as to compensate for the increase in hydrostatic pressure during the descent. For such a purpose, the underwater worker 55 manually insufflates air inside the water-tight container 20 through the underwater immersion equipment and the connection interface 23 to it, thus counteracting the inward bending of the walls thereof 20 and facilitating the subsequent aperture of the container 20. On the other hand, in the case in which there is excessive difference in pressure between inside the container 20 and the surrounding environment, it could only open with extreme difficulty.

Once the greenhouse 10 has been reached, the water-tight container 20 is inserted inside the balloon 11 through the aperture 12 for lower access and rested on the runoff drains at the technical area.

The seedbed 53 is then extracted and positioned on a shelf 17 in the destination area.

Once the cultivation is finished, a water-tight transport container 20 of the same type is used to bring the seedbeds 53 back to the surface together with the crops or the harvest, according to whether the harvest takes place in the underwater greenhouse 10 or at the surface.

During the transportation to the surface, the pressure in excess that is generated due to air expansion is discharged through the connection interface 23 of the container 20 to the underwater immersion equipment.

From the description made the characteristics of the greenhouse and of the assembly for underwater cultivation of terrestrial plant species object of the present invention should be clear, just as the relative advantages should also be clear.

The Applicant has found that the growing environment that is created in the underwater greenhouse is capable of sustaining itself substantially independently from human intervention.

Indeed, the chlorophyll photosynthesis cycle carried out by the elements present in the greenhouse make it superfluous to reintegrate with oxygen and/or with carbon dioxide the atmosphere inside the balloon for the entire growth period of the seeds.

Moreover, thanks to the air/water interface present at the aperture for lower access of the balloon, the atmosphere inside the greenhouse is highly humid, leading to the creation of fresh water condensation on the inner walls of the balloon which is collected on the shelves and therefore in the seedbeds, making it superfluous to irrigate the crops.

This is also facilitated by the possibility of sufficiently limiting the dehydration of the crops, by positioning the greenhouse at the most suitable depth, and therefore selecting the light frequencies to which to expose the cultivations, filtered by the absorption of the water column above.

Advantageously, the temperature of the bubble is kept essentially constant due to thermal hysteresis of the surrounding water that reduces the temperature range to which the crops are subjected with respect to the cultivations on the surface.

Finally, the isolated environment inside the greenhouse makes it highly improbable for the crops to become contaminated by microorganisms such as for example parasites.

Last but not least, the water-tight container used in association with the greenhouse for underwater cultivation of terrestrial plant species according to the present invention also makes it possible to transport the seeds and the harvest from and towards the greenhouse without being contaminated with the surrounding underwater environment.

It is indeed clear that the greenhouse and the assembly for underwater cultivation of terrestrial plant species thus conceived can undergo numerous modifications and variants, all covered by the invention; moreover, all the details can be replaced by technically equivalent elements. In practice the materials used, as well as the dimensions, can be any according to the technical requirements.

The invention claimed is:

1. Greenhouse (10) for underwater cultivation of terrestrial plant species wherein said greenhouse comprises a balloon (11) adapted to being filled with air in an underwater environment (50), said balloon (11) comprising a lower aperture (12) for lower access to said balloon (11), said balloon (11) being made from material that is impermeable to water and permeable to light, said balloon (11) comprising at least one inner support shelf (17) having at least one seedbed (53) and means for restraining (14) said balloon (11) to a floor (51) of an aquatic basin said balloon (11) comprising at a top portion opposite to said lower access aperture (12), a first vent valve (15) for releasing air inside said balloon (11), wherein said balloon (11) also comprises a second adjustment valve (16) for adjusting a level of a water-air interface (52) inside said balloon (11), said second adjustment valve (16) being integrated in a surface of said balloon above a surface of the water(11) substantially at the height of said lower access aperture (12) and said at least one inner support shelf (17) being arranged at a higher height with respect to said second adjustment valve (16).

2. Greenhouse (10) for underwater cultivation of terrestrial plant species according to claim 1 wherein said balloon (11) is made of flexible material.

3. Greenhouse (10) for underwater cultivation of terrestrial plant species according to claim 2 wherein characterised in that said balloon (11) comprises a rigid ring element (13) at said lower access aperture (12) where said rigid ring element (13) is disposed around a perimeter of said lower access aperture (12).

4. Greenhouse (10) for underwater cultivation of terrestrial plant species according to claim 1 wherein characterised in that said means of restraint (14) to the floor (51) comprising a plurality of cables (14a) connected below to at least one anchor (14b) or a least one ballast weight.

5. Greenhouse (10) for underwater cultivation of terrestrial plant species according to claim 4 wherein characterised in that said at least one anchor (14b) is made in the form of a rod comprising, at a first end, an eyelet (14b') for connecting to said plurality of cables (14a) and, at a second end, a rotary auger (14b") for sinking into said floor (51) of the aquatic basin.

6. Greenhouse (10) for underwater cultivation of terrestrial plant species according to claim 1 wherein said first vent valve (15) comprising a circular base body (15a) integrated in a surface of said balloon (11), at an upper aperture of said balloon (11), the circular base valve body (15a) having a threaded portion for joining to a threaded cylindrical closing element (15b), with a lateral through hole (15c), with a closing body (15b) having an upper cover (15d).

7. Greenhouse (10) for underwater cultivation of terrestrial plant species according to claim 1 wherein said upper cover (15d) is removable.

8. Greenhouse (10) for underwater cultivation of terrestrial plant species according to claim 1 wherein said second adjustment valve (16) comprises an L-shaped tubular element.

9. Greenhouse (10) for the underwater cultivation of terrestrial plant species according to claim 1, wherein said at least one internal support shelf (17) is arranged perimetrically to an interior surface of said balloon (11).

10. Greenhouse(10) for the underwater cultivation of terrestrial plant species according to claim 1, wherein said at least one internal support shelf (17) is made from flexible material in a form of a pocket.

11. Assembly for underwater cultivation of terrestrial plant species comprising a greenhouse (10) for the underwater cultivation of terrestrial plant species wherein said greenhouse comprises a balloon (11) adapted to being filled with air in an underwater environment (50), said balloon (11) comprising a lower aperture (12) for lower access to said balloon (11), said balloon (11) being made from material that is impermeable to water and permeable to light, said balloon (11) comprising at least one inner support shelf (17) having at least one seedbed (53) and means for restraining (14) said balloon (11) to a floor (51) of an aquatic basin said balloon (11) comprising at a top portion opposite to said lower access aperture (12), a first vent valve (15) for releasing air inside said balloon (11), wherein said balloon (11) also comprises a second adjustment valve (16) for adjusting a level of a water-air interface (52) inside said balloon (11), said second adjustment valve (16) being integrated in a surface of said balloon above a surface of the water (11) substantially at the height of said lower access aperture (12) and said at least one inner support shelf (17) being arranged at a higher height with respect to said second adjustment valve (16) wherein at least one water-tight container (20) comprising a box-shaped body (21) fitted with a cover (22) that is at least partially removable and an interface (23) for connecting to underwater immersion equipment.

12. Assembly (100) for underwater cultivation of terrestrial plant species according to claim 11 wherein said at least one water-tight container (20) has ballast weights.

13. An assembly for underwater cultivation of terrestrial plant species comprising a greenhouse (10) for the underwater cultivation of terrestrial plant species wherein said greenhouse (10) for underwater cultivation of terrestrial plant species comprises a balloon (11) adapted to being filled with air in an underwater environment (50), said balloon (11) comprising a lower aperture (12) for lower access to said balloon (11), said balloon (11) being made from material that is impermeable to water and permeable to light, said balloon (11) comprising at least one inner support shelf (17) for housing at least one seedbed (53) and means for restraining (14) said balloon (11) to the floor (51) of the aquatic basin and at least one water-tight container (20) comprising a box-shaped body (21) fitted with a cover (22) that is at least partially removable and an interface (23) for connecting to underwater immersion equipment wherein said at least one water-tight container (20) has ballast weights.

\* \* \* \* \*